United States Patent [19]

Drapkin

[11] 3,886,317

[45] May 27, 1975

[54] SYNCHRONOUS DATA CHANNEL FOR PULSE CODE MODULATION COMMUNICATIONS SYSTEM

[75] Inventor: Paul E. Drapkin, Palo Alto, Calif.

[73] Assignee: Vidar Corporation, Mountain View, Calif.

[22] Filed: Dec. 17, 1973

[21] Appl. No.: 425,215

[52] U.S. Cl. .......................... 179/15 BY; 179/15 BV

[51] Int. Cl. .............................................. H04j 3/12

[58] Field of Search.... 179/2 DP, 3, 15 BY, 15 BM, 179/15 BS, 15 A, 15 BV; 340/69.5 R, 172.5

[56] References Cited

UNITED STATES PATENTS

| | | | |
|---|---|---|---|
| 3,610,832 | 10/1971 | Strobel | 179/15 BY |
| 3,660,606 | 5/1972 | De Witt | 179/15 BY |
| 3,790,715 | 2/1974 | Inose | 179/15 BV |

*Primary Examiner*—Ralph D. Blakeslee
*Attorney, Agent, or Firm*—Flehr, Hohbach, Test, Albritton & Herbert

[57] ABSTRACT

One voice channel of a T1 PCM terminal of an exchange carrier system is replaced with a synchronous channel unit which may be run at various data rates with a clock which is supplied internally utilizing the basic clock repetition rate of the PCM system. This internal clock is derived by removing selected bits and counting down digitally.

14 Claims, 7 Drawing Figures

SYNCHRONOUS DATA CHANNEL FOR PULSE CODE MODULATION COMMUNICATIONS SYSTEM

BACKGROUND OF THE INVENTION

The present invention is directed in general to data channels for use with a pulse code modulation (PCM) communications system and more specifically to PCM systems used in the telephone field as an exchange carrier system.

PCM exchange carrier systems are well known for transmitting analog or voice information. In such systems, the message to be transmitted is periodically sampled to provide pulses whose amplitude is proportional to the signal level at the instant of sampling. The pulse amplitude is then quantized and encoded. Specifically, a typical coder might express the sample amplitude as a seven digit binary number having one of 128 different possible signal levels.

More than one message may be transmitted at one time by time division multiplexing techniques. In one particular pulse code transmission system, the incoming messages (normally speech or analog information) are sampled 8,000 times per second by a sampling gate associated with each message channel. Such analog sample is then encoded into seven binary digits with an eighth time slot which carries supervisory signals. 24 channels may be sampled in a recurring sequence. Since each sample requires eight time slots, the 24 samples require a total of 192 time slots on the PCM transmission line. An additional or 193rd time slot is added to permit synchronization or framing. Thus, the 193 time slots comprise a framing period. The basic repetition rate of pulses on a line is 1.544 million pulses per second which is 193 times the basic sampling rate of 8,000.

Where it has been desired to use the above carrier system in conjunction with a computer data terminal one technique has been to convert the digital data from the computer terminal to analog data and then treat such data in an identical manner as if it were speech or voice information. Such a technique is obviously inefficient and low speed. Other prior art systems have converted the existing exchange carrier system to an exclusively digital data system having a fixed data rate. Such a system as well as being expensive is inflexible from a data rate standpoint and prevents the line from being used for voice purposes.

Yet other techniques provide a data voice multiplex unit in the central office but requires additional equipment between the customer and the central office to accommodate data such as a data service unit at the customer's location and an office channel unit in the central office as well as a D3 terminal and a data voice multiplexer. Again this is somewhat costly and inefficient.

OBJECTS AND SUMMARY OF THE INVENTION

It is, therefore, an object of the present invention to provide a digital data channel which may be easily used in conjunction with a typical voice terminal of a PCM exchange carrier system.

It is another object of the invention to selectively replace a voice channel of a PCM carrier system with a synchronous data channel which is operable at many different selected synchronous data rates.

It is yet another object to provide a system as above which provides a single terminal for both voice and data.

In accordance with the above objects there is provided a pulse code modulation (PCM) communications system for transmitting information from a plurality of channels some of the channels being for transmission of voice type data and at least one channel being for synchronous digital input data. The repetition rate of the transmitted pulses is a predetermined clock frequency. A channel counter generator determines the plurality of channels. The invention comprises clock generator means for receiving the clock frequency and deriving therefrom a signal for timing the synchronous digital input data. Storage register means store said digital data. Gating means are responsive to the channel counter generator counting to the one digital data channel for transferring the stored data to a PCM transmit bus.

BRIEF DESCRIPTION OF THE DRAWINGS

FIGS. 5A – 5F are waveforms present in FIG. 2;

FIGS. 6A – 6F are further waveforms present in FIG. 2; and

DETAILED DESCRIPTION OF THE PREFERRED EMBODIMENT

Figure 1:
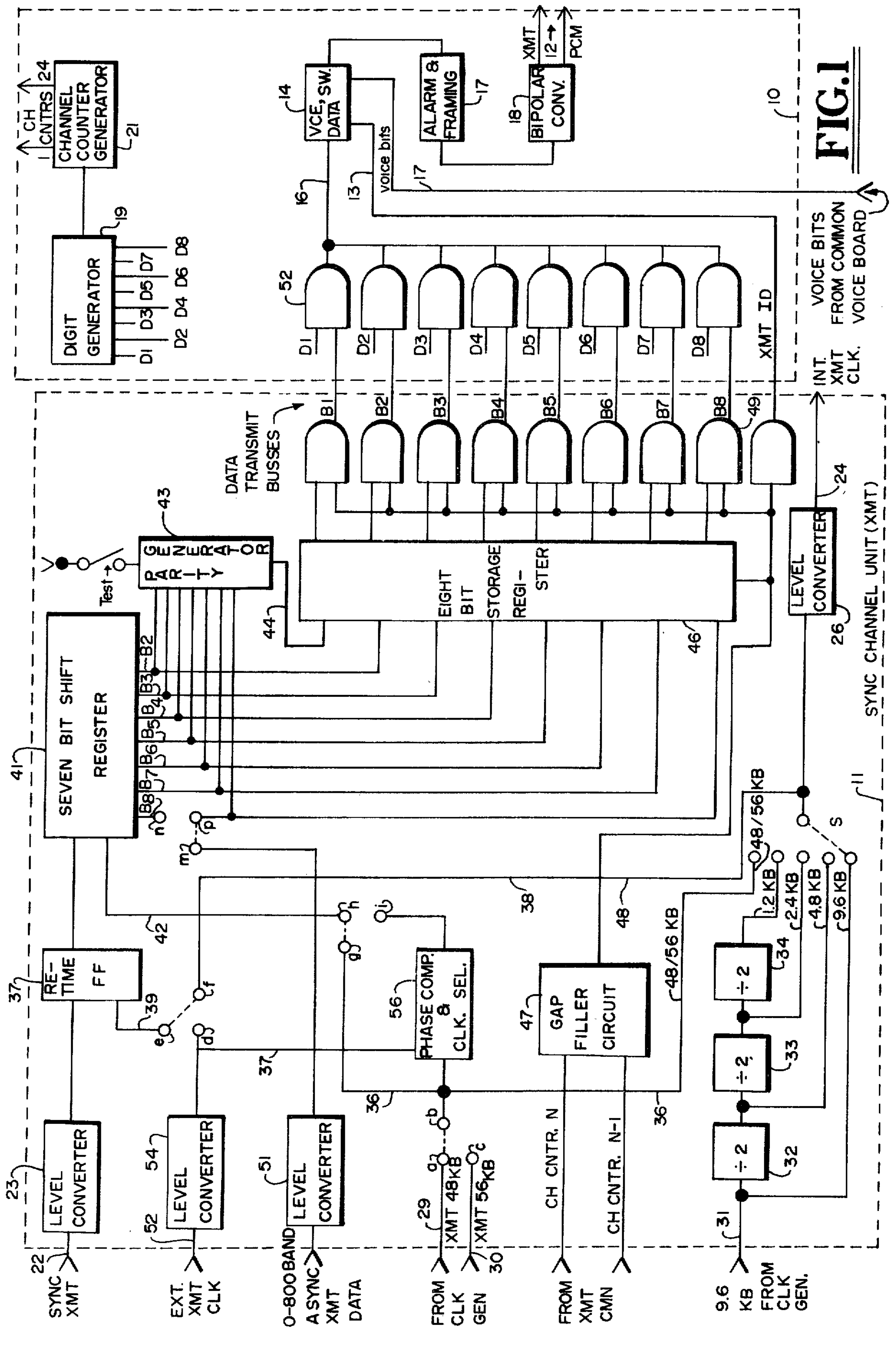
FIG. 1 is a block diagram of the transmit portion of the PCM communications system embodying the present invention.

FIG. 1 shows the transmission portion of the system including transmit common unit 10 and synchronous channel transmit unit 11. The pulse code modulation transmission line labeled XMT PCM is shown at 12 and carries 24 channels of a combination of voice and digital data. The voice bits from the common voice board enter the common unit 10 on line 13 and are switched by a voice/data switch 14. If digital data bits are being supplied on the input line 16 as indicated by the transmit ID line 17, then that particular channel will, of course, be unusuable for voice or analog information. Switch 14 is coupled to a typical alarm and framing unit 17 and a bipolar converter 18 in accordance with well known techniques in the PCM communications art. Transmit common unit 10 would normally include all equipment typically associated with analog type PCM communication systems for telephone exchanges. These include a digit generator 19 for producing D1 through D8 digits and a channel counter generator 21 for providing 24 timed channel counter signals in each framing period of the PCM system.

In accordance with the invention, digital data is accepted at the input 22 designated "synchronous transmit data." This input is coupled to a level converter 23 for conversion of the signal from the peripheral terminal to the proper level for encoding by the sync channel unit 11. In one mode of operation the peripheral computer or data source is synchronized by the internal transmit clock output 24 which is coupled to level converter unit 26. The transmit clock output is coupled by means of switch S to a selected one of six different data rates; viz., the 48, 56KB and 9.6, 4.8, 2.4 and 1.2 KB. These various frequencies are derived from the basic pulse rate of the PCM system in a clock generator unit illustrated in FIG. 2. Very briefly, the basic pulse rate of 1.544 megabits and the 8 KB pulse rate framing pulse DF are supplied on inputs 27 and 28 of the clock generator unit from the common board. After processing, which will be described in detail below, by the clock generator unit, 56KB, 48KB and 9.6KB clocks are provided on the output lines 29, 30 and 31 respectively. Line 31, the 9.6 KB output, referring now to FIG. 1, also provides the 4.8, 2.4 and 1.2 KB outputs of switch S means of divide by two units 32, 33 and 34. The 48 and 56 KB lines, 29 and 30, respectively, supply the switching terminals *a* and *b*. Switch terminal *c* is switchable between terminals *a* and *b* and coupled to a line 36 which is connected to the 48/56 KB terminal of switch S.

In one mode of operation, the speed of the channel unit might be run at 9.6 KB. In this case, all of the contacts are shown as strapped for that speed by the dashed lines. Specifically, in switch S the 9.6 KB terminal is strapped, the *a–c* strap is completed, and the *g–h*, *e–f*, and *m–p* straps. The internal transmit clock line 24 is, of course, coupled to the external source of data in order to provide for synchronous operation.

The output of level converter 23 from synchronous transmit data input line 22 is coupled to a retime flip-flop 37 which makes a decision as to whether the data is a 1 or a 0 and correct any phase errors in the data. Flip-flop 37 is clocked by means of the *e–f* strap at the 9.6 KB rate through the line 38 from switch S.

The output of flip-flop 37 is connected to a seven bit shift register 41. Shift right input 42 of register 41 is strapped by *g–h* to the 48 KB transmit clock on line 29 by means of strap *a–c*. Thus in operation, the shifting into the retime flip-flop 37 occurs at the synchronous data rate of 9.6 KB whereas the shift of data into the shift register occurs at a 48 KB rate. Thus, the same bit is replaced in the shift register five times; that is, 48 divided by 9.6.

Register 41 has outputs B2 through B8. These are coupled both to a parity generator 43, which takes the seven bits from the shift register (unless bit B8 is strapped otherwise as will be explained below) and generates odd parity on line 44, and to an eight bit storage register 46. The parity bit on line 44 is the eight data input to eight bit storage register 46.

Information stored in storage register 46 is shifted out at the basic sampling rate of the PCM system which is 8 KB. This is provided by the gap filler circuit 47 which is driven by the channel counter line N (that is, the channel for which the digital data desired of the PCM system) and the previous channel line N-1 from the channel counter generator 21. The gap filler circuit 47 provides a full 5.2 microsecond second wide pulse on the output line 48. Normally there is a gap between one channel pulse and the next. In essence, the gap filler circuit is responsive to the trailing edge of the previous channel counting pulse and the trailing edge of the present pulse. This pulse on line 48 drives the storage register 46 and also closes the AND gates 49 coupled to the 8 bit data outputs of storage register 46.

Thus, from a timing standpoint, data is being shifted into the seven bit register 41 at a 48 KB rate and is shifted out at a 8 KB rate which gives a 6:1 ratio. Thus, six bits are shifted into the seven bit shift register 41 and then shifted down in the storage register 46 and through the AND gates 49. Thus, in the 9.6 KB mode the bit B8 of shift register 41 is ignored. However, as illustrated in FIG. 1, this may be used for another asynchronous channel by providing the *m* to *p* strap and coupling through level converter 51 to a 0 to 800 Baud asynchronous transmit data input. This needs no clocking. It is merely placed in the storage register 46, ANDed in AND gate 49, and placed on the B8 transmit bus.

Each of the 8 bits from the AND gates 49 are coupled on the outputs labeled B1 through B8 data transmit busses to the digit gates 52 of transmit common unit 10. These digit gates are also coupled to the D1 through D8 outputs of digit generator 19 to become a serial word on data bit line 16. Thus in summary, the original serial data train on input line 22 was converted to a parallel train by means of storage registers 41 and 46 and then reconverted back to a bunched serial train at a higher rate suitable for being transmitted over the PCM line 12. Such rate is, of course, 1.544 MB.

Data bits on line 16 are coupled into the voice/data switch 14 and in response to an indication on the transmit ID line 17 which is coupled to the gap filler circuit output 48 the switch is closed for data and rejects any voice bits. As discussed above, if there is no transmit ID then the particular channel will accept voice bits. In this manner the voice and data channels are combined into one stream. Additional voice or data channels may be added and specifically additional data lines may be coupled in parallel on the data transmit bus lines and additional voice information may be added on the voice bit line 13. Thus, the 24 channels of the PCM communications system will provide a typical 1.544 MB data rate that is sent over the normal T1 PCM format with voice and data and mixed together.

The foregoing discussion is applied to a situation where the internal transmit clock output line 24 was utilized to synchronize the synchronous transmit data input on line 22. In such a case, the internal clock is, of course, necessarily and inherently in synchronism with the frequency of the input data. However, such phase relationship can be arbitrary. In other words, in some applications the received clock of one terminal becomes the external transmit clock and the received data becomes the transmit data. This might be utilized in a tandem telephone application. In case, such external transmit clock is coupled to input terminal 53. The output of level converter 54 clocks the retime flip-flop 37 by strapping *d* to *e*. In order to prevent a race condition between the shift right pulses and the external transmit clock, the phase comparator and clock selector unit 56 is coupled either to the 48 KB or 56 KB clock pulses generated internally and strapped via *h–i* to the shift right input line 42. The phase is adjusted to prevent a race condition.

For the other speeds of 4.8, 2.4 or 1.2 KB the switch S is changed to the appropriate data rate. However, for the 56 KB rate all seven bits are needed in shift register 41. Thus, in addition to placing swtich S in the 48/56 KB position and strapping *b* to *c* to utilize 56 KB shift right clock for the shift register, *p* to *m* must be strapped so that the seventh bit of the shift register is coupled to storage register 46. This is because seven bits are necessary for 56 KB. Thus, the extra 0 to 800 Baud synchronous channel is not available.

One other precaution safeguard of the circuit which is used when an internal clock is being used for shift right is that the 8 KB output of gap filler circuit 47 should be at least 300 or 400 nanoseconds apart in time at any particular moment from the shift right clock. This is to ensure that nothing is shifted into the seven bit shift register 41 at the same instant of time that the information from the 8 bit storage register 46 is being transferred out.

Another feature of the invention is a switch to parity generator 43 labeled "Test" which switches the parity generator from its normal odd parity to even parity. This generates an alarm on the receive side of the circuit and acts as a rapid check to insure that all circuit components are in working condition.

Figure 3:
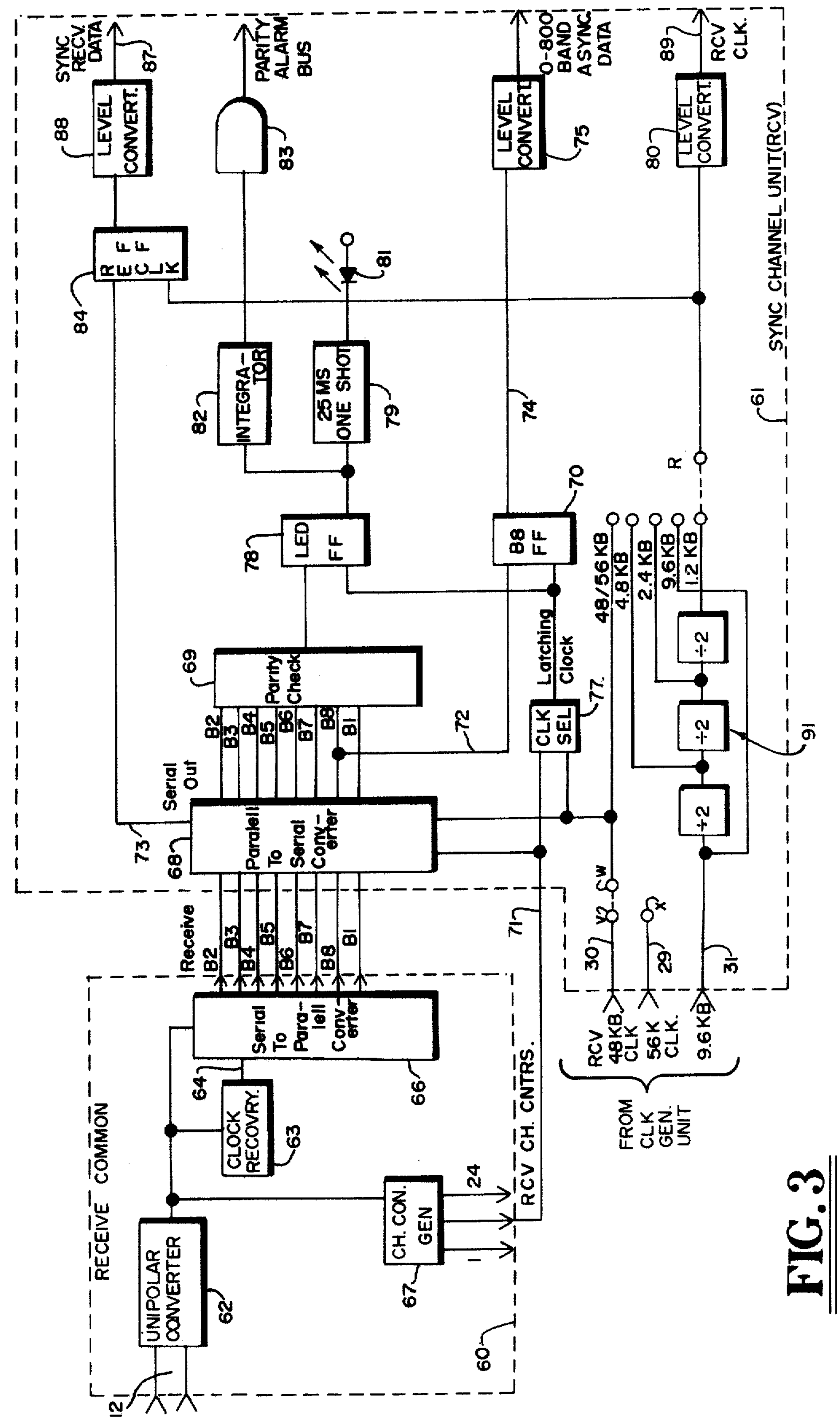
FIG. 3 is a block diagram of the receive portion of the PCM communications system embodying the present invention.

FIG. 3 illustrates the receive side of the system and includes a receive common unit 60 and a synchronous receive channel unit 61. In the receive common unit 60 the bipolar signal is received from line 12 and converted from bipolar to unipolar or to a two-state logic signal from the original three-state signal in unipolar converter 62. A clock recovery unit 63 in the form of a phase locked loop recovers the basic clock frequency on line 64 which is connected to serial to parallel converter 66. The output of the unipolar converter 62 also is connected to channel counter generator 67 where 24 channel counts are generated as explained above. Serial to parallel converter 66 has eight receive busses; namely, B2 through B8 and B1. In addition to being coupled to the synchronous channel unit 61 these busses are also coupled to the voice common equipment in the case where the channel is carrying analog or voice signals.

In the case of the present invention, however, the receive buses are coupled to a parallel to serial converter 68. It is also a parallel to parallel converter. Specifically, it's eight parallel outputs labeled B2 through B8 and B1 and are coupled to a parity checker 69. The parallel load signal on line 71 is one of the outputs of the channel counter 67.

The synch channel unit 61 is, of course, associated with a particular one of 24 channels. A shift right input 72 can shift the parallel bits out on the serial out line 73 at either a 48 KB or 56 KB rate as determined by the strapping *v–w* or *x–w*. The receive clocks are then derived from a clock generator unit in the receive common unit.

Thus, for example, if the system is operating at a 48 KB rate and a shift right is occurring at a 48 KB rate, effectively six bits are being shifted out of the register. Of the other two bits, the B8 bit is coupled on the parallel output line to a B8 flip-flop 70. The output 74 of the flip-flop is coupled to a level converter 75 to provide the 0–800 Baud asynchronous data output channel. The B8 flip-flop 70 converts the signal from a sampled waveform to a continuous waveform. A clock select unit 77 is driven by the channel counter on line 71 and in the case of the use of a 48 KB signal rate or below, the 48 KB receive clock. Thus, a clock is generated and at a moment before or at the instant of time the 8 bits are in the serial to parallel converter 68 the B8 flip-flop 70 is set along with the LED flip-flop 78. Thus, in effect, the bit is sampled at this one instant in time and converted by means of flip-flop 73 to a continuous level on line 74. This is also true of the error detecting LED flip-flop 78 where if an error is present or a test is being conducted the 25 millisecond one shot multivibrator 79 illuminates the light emitting diode 81 to indicate an error condition. At the same time the integrator 82 senses an output from LED flip-flop 72 and drives the gate 83 of a parity alarm bus.

Parity checking is, of course, accomplished by the B1 bit. If there is a single error, that is a single parity violation, the light 81 will be illuminated. An alarm indication on the parity alarm bus occurs only if there is a high error rate for a sufficient period of time.

Now referring to the serial output 73 which carries the actual string of data, in the case of the 48 KB shift right clock data bits are shifted right at the 48 KB rate into the reclock flip-flop 84. The reclock flip-flop reclocks at the particular data rate selected by switch R; that is, one of the five different rates illustrated. The same switch R also provides through level converter 86 a receive clock. The reclock flip-flop insures that the synchronous receive data output on line 87 from the level converter 88 has the proper phase relationship with the receive clock output 89.

Various receive speeds are provided by switch R and the divide by two flip-flops 91 in the same manner as the transmit synchronous channel unit. The data channel of the present invention can also be used for 0 to 4800 Baud asynchronous data transmission. This is done by strapping the transmit and receive units as if they were running at 48KB and ignoring all clock signals. The data is merely placed on the synchronous transmit data unit input 22. Effectively, what is being done is that such asynchronous data is being sampled at a 48 KB rate or ten times the highest rate of 4800 Baud. At the 4800 Baud rate this causes a maximum of 10 percent distortion. At 2400 Baud there is 5 percent distortion.

Figure 2:
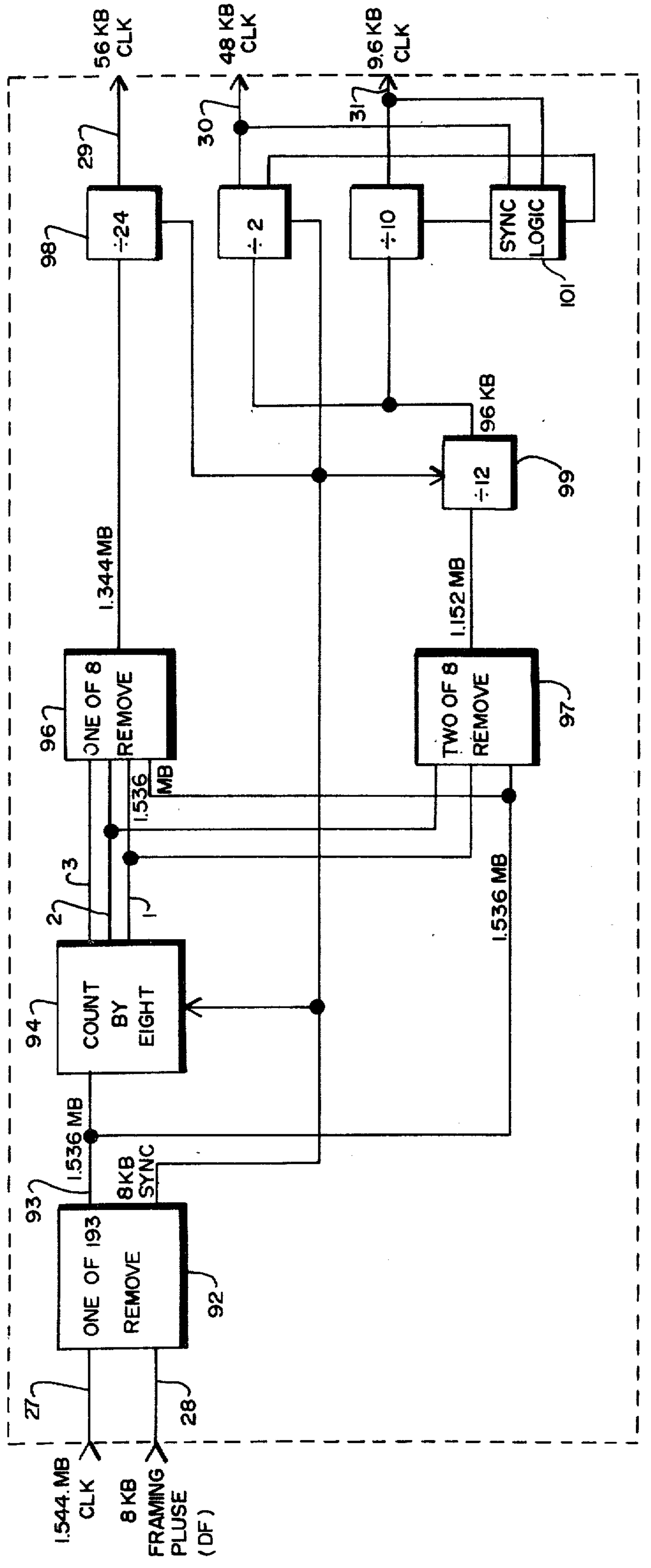
FIG. 2 is a block diagram of a clock generator unit used with both the transmit and receive portion of the PCM system.
Figures 4, 5, 6:
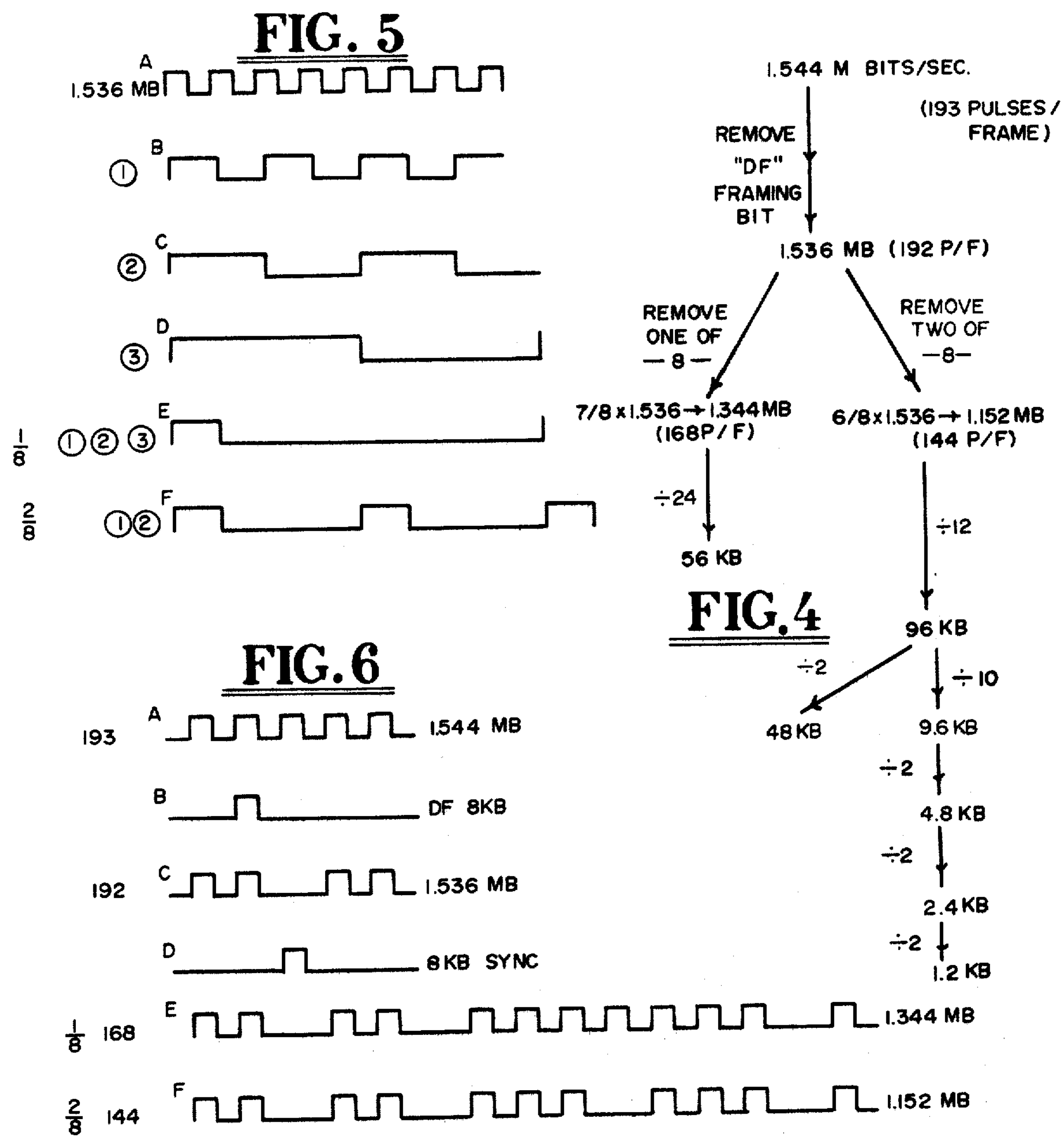
FIG. 4 is a flow chart useful in understanding the invention.

The clock generator unit which is used both in the transmit and receive synchronous channel units of the present invention is shown in block diagram in FIG. 2 and its functioning is illustrated in FIG. 4. The basic pulse rate of 1.544 MB is coupled on line 27 along with the framing pulse DF which occurs at an 8 KB rate on line 28 to a one of 193 remove unit 92. It provides on line 93 a 1.536 MB rate which is connected to a count by eight unit 94. Such unit has three output lines designated 1, 2 and 3 which drive a 1 by 8 remove unit 96 and a 2 by 8 remove unit 97. These respectively provide 1.344 MB and 1.152 MB rates. A divide by 24 unit 98 provides the 56 KB clock output on line 29. A divide by 12 unit 99 provides the 96 KB rate which when it is divided by 2, is the 48 KB output on line 30 and when divided by 10 is the 9.6 KB output on line 31. A sync logic unit 101 coupled to the divide by 2 and 10 units prevents any race condition. Specifically, it fixes the phase relationship of the clock frequencies of the clock generator to the channel counter frequency by relating both to the 8K bit DF pulse.

FIGS. 5A through 5F are waveforms useful in understanding the operation of the clock generator of FIG. 2. Specifically, FIG. 5A is the 1.536 MB input to the count by 8 unit 94. In FIG. 5B indicated as 1 the above pulse rate has been divided by 2; in FIG. 5C, the FIG. 5B pulse has been divided by 2 and again in FIG. 5D another division by 2 has occurred to provide the waveforms on the line 2 and 3 of count by 8 unit 94. When the 1, 2 and 3 pulses are added in one of eight remove unit 96, this provides the waveform of FIG. 5E. When logically combined with the input waveform of FIG. 5A this eliminates one out of eight of these pulses. Similarly, FIG. 5F illustrates the two out of eight remove waveform which is the result of ANDing the waveforms 1 and 2 of FIGS. 5B and 5C. It should be noted that such waveform has equally spaced pulses which when ANDed with FIG. 5A produces the resultant 1.152 MB pulse repetition rate which is substantially symmetrical in character to thus reduce distortion.

FIGS. 6A through 6F illustrates the actual pulse trains. FIG. 6A is the 193 pulses per frame pulse train which occurs, of course, at the 1.544 MB rate. FIG. 6B is the DF framing pulse which occurs at the 8 KB rate. One of 193 is removed to produce FIG. 6C. This is accomplished by shifting the phase of the DF pulse of FIG. 6B to that of 6D. FIG. 6E has one additional pulse for every eight pulses removed as illustrated and FIG. 6F shows two additional pulses of every eight removed while maintaining a substantially symmetrical waveform by removing every fourth bit.

Figure 7:
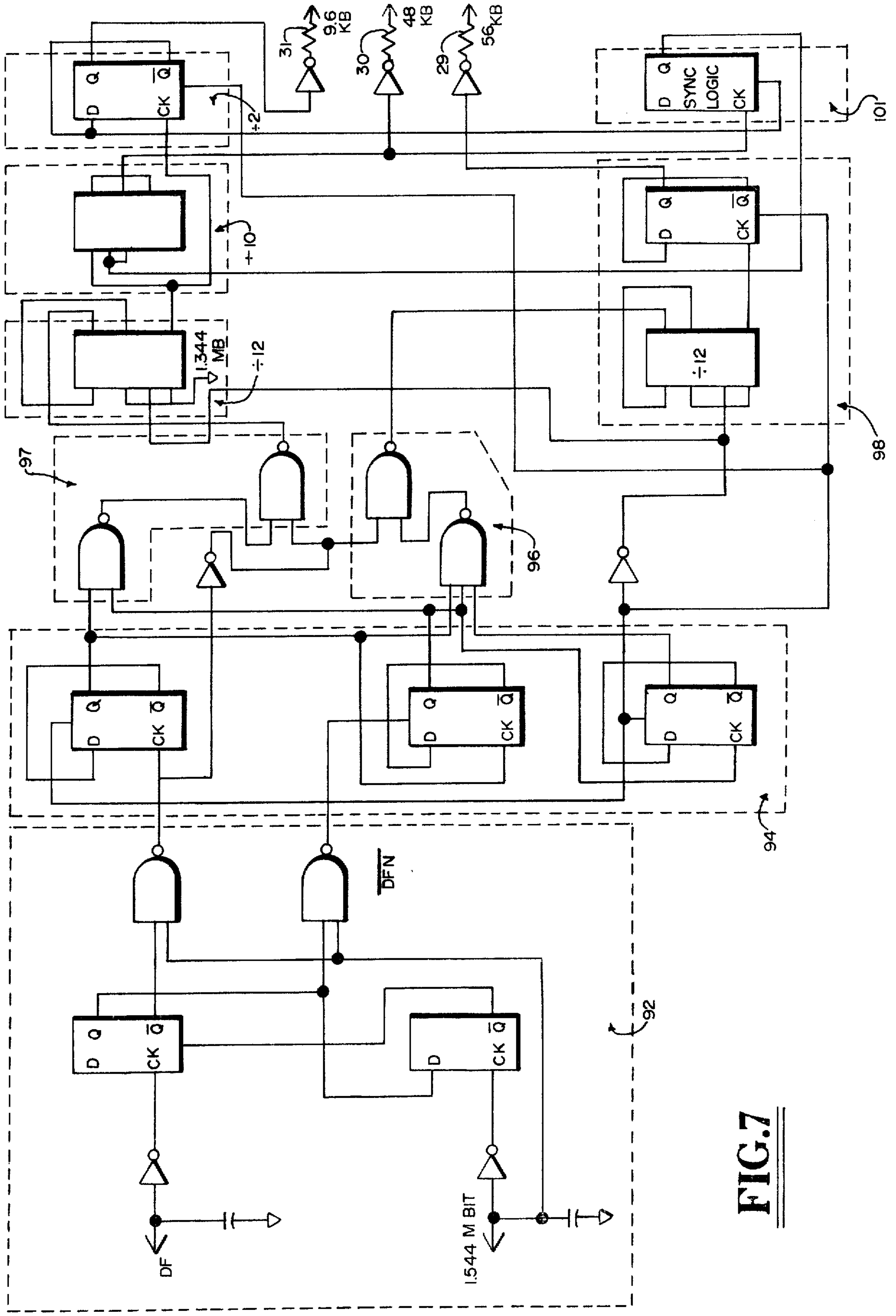
FIG. 7 is a more detailed block diagram of FIG. 2.

FIG. 7 illustrates the specific detailed logic showing the flip-flop circuits, inverters, and NAND gates which are used in the block diagram of FIG. 2.

With the foregoing technique by removing selected bits from the 1.544 MB clock and counting down digitally low distortion clocks of less than 2.6 percent at 56 KB are provided for synchronous data use. At 9.6 KB and below the distortion is less than 1 percent. In addition, asynchronous channel capability at a lower data rate is provided.

I claim:

1. A pulse code modulation (PCM) communications system for transmitting information from a plurality of channels such system including a framing bit some of said channels being for transmission of voice type data but at least one channel being exclusively for synchronous digital input data from a single external source of data the repetition rate of transmitted pulses being a predetermined clock frequency said system including a channel counter generator for determining said plurality of channels comprising: clock generator means for receiving said clock frequency and for deriving therefrom a signal for timing said synchronous digital data input said clock generator means being responsive to said framing bit for removing at least one bit from said clock frequency for deriving said timing signal; means for connecting said clock generator means to said external source of data to couple said timing signal to said source of data for providing synchronous operation; storage register means for storing said digital data; and gating means responsive to the channel counter generator counting to said one channel for transferring said stored data to a PCM transmit bus.

2. A PCM system as in claim 1 where said clock frequency is 1.544 MBit/sec and said framing bits have a frequency of 8 KBit/sec.

3. A system as in claim 1 where said clock generator means includes means for symmetrically removing two out of eight bits from said clock frequency to provide a substantially symmetrical timing signal.

4. A system as in claim 1 where said clock generator means includes means for removing selected bits and dividing to provide a substantially symmetrical timing signal.

5. A system as in claim 4 together with means for receiving an external transmit clock and shift register means included in said storage register means and shift register means for receiving corresponding data the shift right input of said shift register being clocked by a divided signal from said clock generator means, and pulse comparator means for providing a timing difference between said divided signal and said external transmit clock.

6. A system as in claim 1 where said storage register means includes shift register means for receiving said serial input data at a rate proportional to said synchronous rate of said timing signal and converting it to parallel format and including parallel storage means coupled to said gating means and shift register means whereby said serial input data is bunched into a serial format for transmission on said PCM buss at said clock frequency repetition rate.

7. A system as in claim 1 where said storage register means includes shift register means for receiving said input data such shift register having a shift right input timed by a signal proportional to said timing signal.

8. A system as in claim 7 where said input signal is asynchronous having a data rate of 10 percent or less than said shift signal.

9. A system as in claim 1 where said storage register means includes shift register means for receiving said input data and converting it to parallel format such register providing an additional bit for use as a low data rate asynchronous data channel.

10. A system as in claim 9 together with parity generator means coupled to said shift register means for generating a parity check bit.

11. A system as in claim 10 including test switch means for reversing said parity check bit.

12. A method of transmitting at least one channel of synchronous digital input data from a single external source of data in a pulse code modulation (PCM) communications system which includes a plurality of channels for transmission of voice type data, the repetition rate of the transmitted PCM pulses being a predetermined clock frequency a group of channels comprising a frame and including a framing bit the method comprising the following steps: generating a plurality of data rates for selectively synchronizing digital input data having a predetermined data rate by the steps of removing said framing bit from each of said frames of said clock frequency, thereafter removing two of every eight bits of said above signal and thereafter dividing said above signal to provide a plurality of data rates and timing said digital input data with a selected one of said plurality of data rates.

13. A method as in claim 12 where in said step of removing two of every eight bits, every fourth bit is removed.

14. A pulse code modulation (PCM) communications system for transmitting over a common PCM transmit bus information from a plurality of channels such system including a framing bit, some of said channels being for transmission of voice type data but at least one channel being exclusively for synchronous digital input data from a single external source of data the repetition rate of transmitted pulses being a predetermined clock frequency derived from common equipment both in the transmit and receive portions of said PCM system said system comprising: transmit means including clock generator means for receiving the clock frequency from the transmit portion of said PCM system and for deriving therefrom a signal for timing said synchronous digital input data said clock generator means being responsive to said framing bit for removing at least one bit from said clock frequency for deriving said timing signal and including means for transferring said timed digital data to said PCM transmit bus within the time boundary of said one channel; means for connecting said clock generator means to said external source of data to couple said timing signal to said source of data for providing synchronous operation; and receive means for receiving said digital data transmitted on said PCM bus and including clock generator means for receiving the clock frequency from the receive portion of said PCM system and for deriving therefrom a signal for converting said received digital data from said one channel to a continuous serial pulse train having said synchronous rate.

* * * * *